L. W. GOODLAD.
WHEEL.
APPLICATION FILED APR. 20, 1914.

1,120,929.

Patented Dec. 15, 1914.
2 SHEETS—SHEET 1.

WITNESSES:
H. A. Bowman.
K. Imboden

INVENTOR,
Lawrence W. Goodlad
by F. A. Whiteley
Atty.

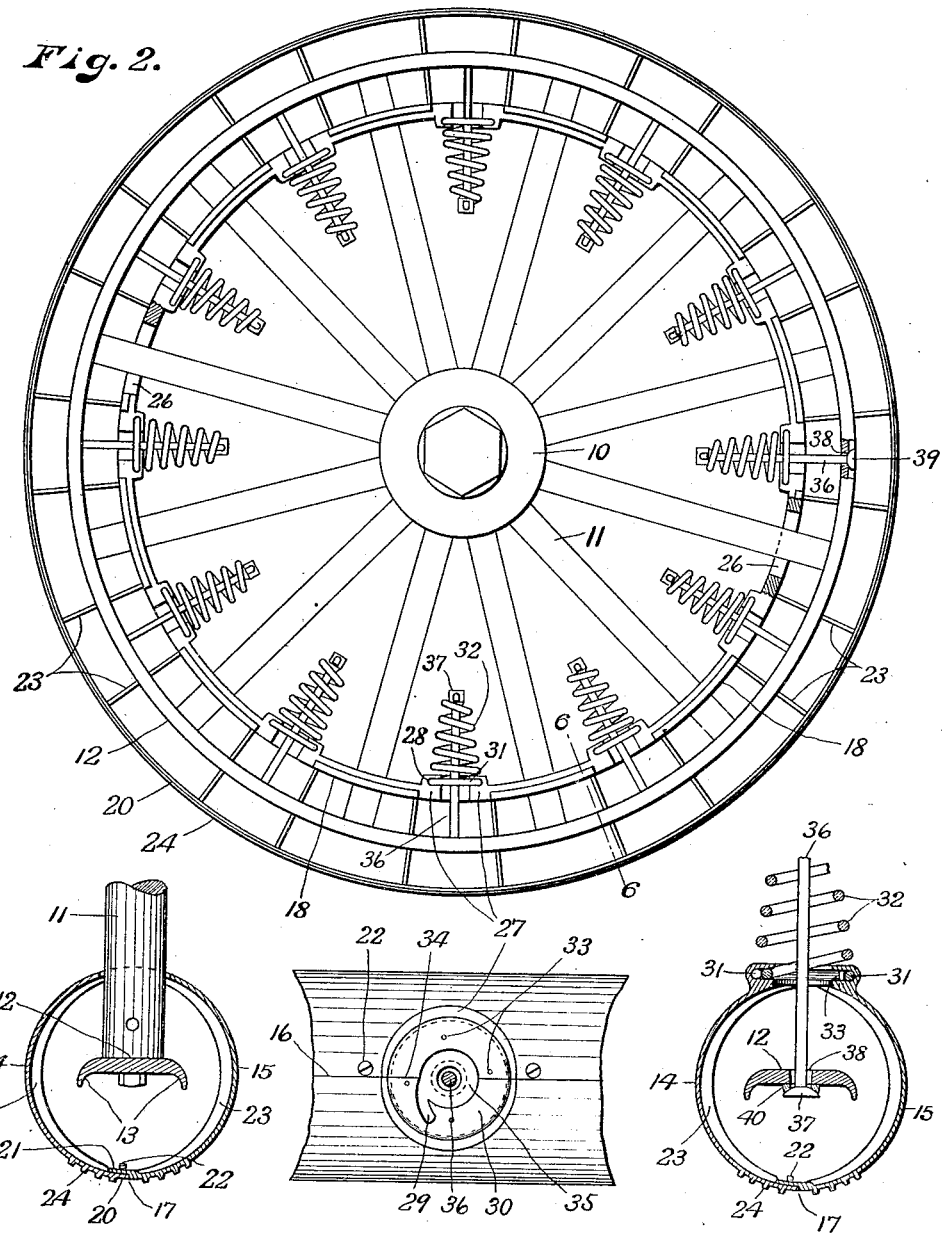
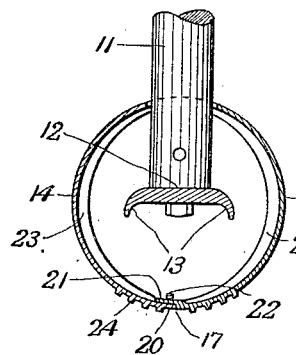 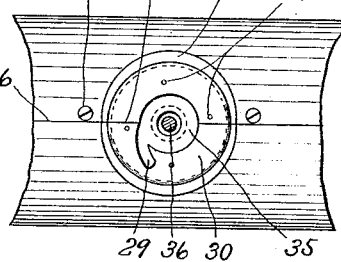 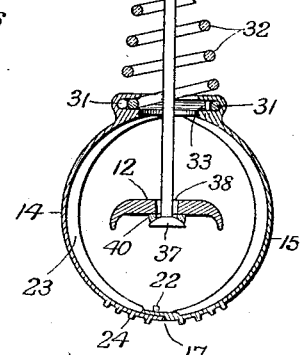

UNITED STATES PATENT OFFICE.

LAWRENCE W. GOODLAD, OF NEW RICHMOND, WISCONSIN.

WHEEL.

1,120,929.  Specification of Letters Patent.  Patented Dec. 15, 1914.

Application filed April 20, 1914. Serial No. 833,055.

*To all whom it may concern:*

Be it known that I, LAWRENCE W. GOODLAD, a citizen of the United States, residing at New Richmond, in the county of St. Croix and State of Wisconsin, have invented certain new and useful Improvements in Wheels, of which the following is a specification.

My invention relates to resilient wheels for automobiles, and has for its object to provide a wheel that may be constructed entirely of metal, including the tire, yet possess the desired resiliency. In other words, the object is to dispense with the costly, troublesome pneumatic tires in automobile wheels.

In my improved wheel construction I provide a tubular metallic tire of rigid nature, a floating rim within and inclosed by this tire, solid spokes, fastened to the floating rim, and springs arranged to transmit the weight from the rim to the tire and hold the rim in proper relation thereto.

The full objects and advantages of my invention will appear in connection with the detailed description thereof and are particularly pointed out in the claims.

Figure 1:
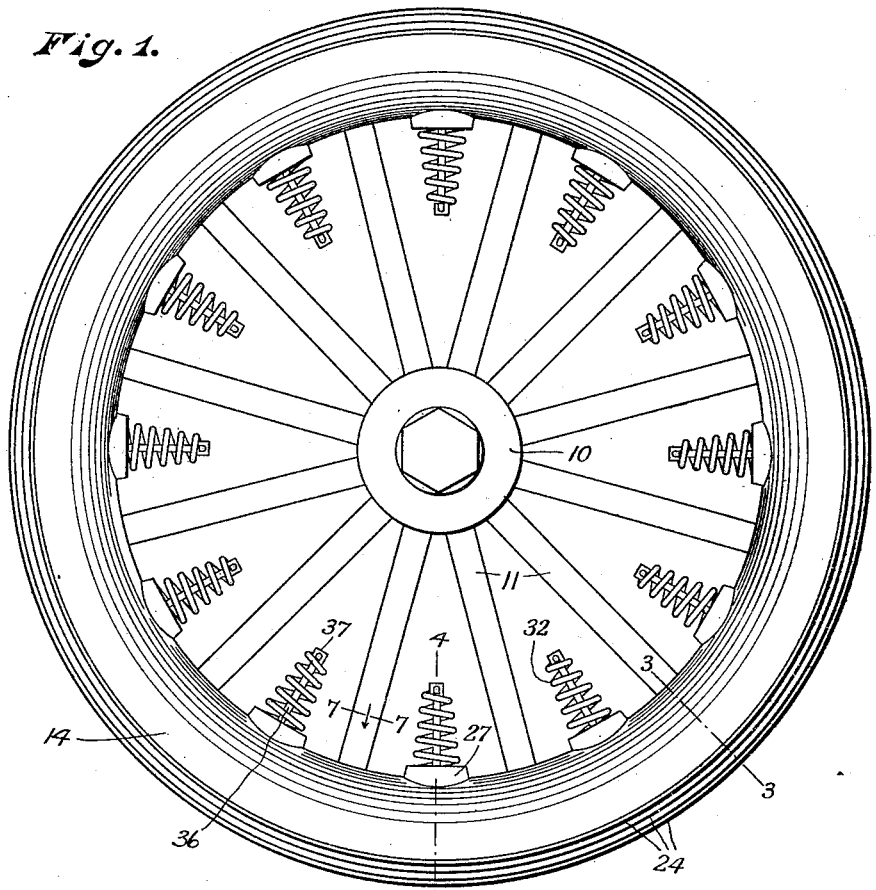
Figure 6:
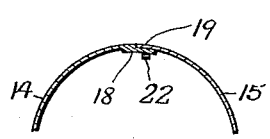
Figure 7:
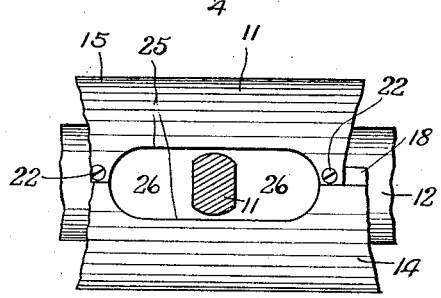
Figure 8:
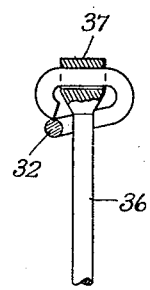

In the accompanying drawings, illustrating the application of my invention in one form,—Figure 1 is a side elevation of a wheel showing one form of my invention. Fig. 2 is a similar view when the outer half of the tire has been removed, a small portion of the other half being in section. Fig. 3 is an enlarged cross-section taken on a line 3—3 of Fig. 1. Fig. 4 is an enlarged cross-section taken on a line 4—4 of Fig. 1. Fig. 5 is a plan view of one of the spring holders, the spring being omitted and the bolt in section. Fig. 6 is a cross-section of the inner portion of the tire showing a lap joint, like that shown in Fig. 3. Fig. 7 is an enlarged sectional view taken on a line 7—7 of Fig. 1, showing a fragment of the tire and a slot through which the spoke passes. Fig. 8 is a detail view of one way of securing each spring to its bolt.

On Figs. 1 and 2, a hub 10 of usual construction is fitted with ordinary wooden spokes 11, all of one length. Their outer ends are rigidly secured to a rim consisting of an endless metal ring 12, which has annular stiffening flanges 13. This ring or rim is supported as presently described.

The tire 14, 15 is composed of two substantially similar complemental parts 14 and 15, the dividing lines being in the plane of the wheel and as shown externally at 16 and 17. The drawings show a preferred form of joint between said parts, in which an offset flange 18 on part 14 fits within the edge 19 of part 15 (Fig. 6) while at the outer periphery (Fig. 3) the edge 20 of part 14 fits over an offset flange 21 of part 15. The halves are secured together by countersunk screws 22, passing through the portions 18, 19, 20, 21 referred to. These screws may be "locked" or made fast by any of the means known to mechanics for that purpose.

Preferably, the tire 14—15 is formed of cast metal, with very thin walls as shown, for lightness, and with a sufficient number of interior transverse ribs 23, which provide the necessary strength and add very little weight to the wheel. The tread portions of the tire may be provided with annular projections 24 or any other form of projections.

Spoke recesses 25 (Fig. 7) are formed in each tire half, each pair of recesses when combined forming a slot 26 which lies parallel with the tire and provides a space at each side of the spoke 11, to permit the spoke to move in the plane of the wheel relative to the tire. Alternately of the spoke slots 26, the tire is provided with a series of spring-holding devices, one of which is shown in detail in Figs. 4 and 5. As shown, a semicircular base 27 is formed on each of the tire parts 14, 15, said base containing an internal semicircular groove 28. When the tire parts are fitted together the circular base 27—27 and annular groove 28 are formed. A notch 29 is cut in the top flange 30. In each groove 28 is seated the base 31 of a helico-spiral spring 32, the notch 29 permitting the spring to pass through the flange 30. The spring base 31 is made secure in its groove by means of pins 33 driven in holes drilled through flange 30 and base 27. The dividing line 34 is on a plane, as shown at 41, as lap joints are unnecessary at these points.

Through the center of the opening 35 in the flange 30 passes a radial bolt 36, having on the inner end a head 37 through which the inner end of spring 32 is passed, thus making positive connection between spring and bolt. The bolt passes outwardly through a circular hole 38 in the rim 12, and has a head 39 having a convex inner face. Preferably this head lies in a concave socket milled in the rim 12, but a wear-plate 40 may be employed between the parts as shown in Fig. 4. The bolt 36 is thus pivotally connected to the rim 12 and may oscillate without touching the hole 38. The construction just described will apply to all of the springs 32 and bolts 36 in the wheel.

Before the tire halves are assembled, the rim 12 and spokes 11 are laid thereon, and the bases of the springs 32 inserted in the half-grooves 28. The other half of the tire is then put in place and fastened, after which the spring retaining pins 33 are inserted. This completes the construction of the tire.

The mode of operation of this wheel will be understood without much explanation. The drawings show the parts as in a detached wheel, the hub being free of weight. When the weight of a vehicle is on the wheel, the downward pressure will compress the springs at the bottom of the wheel and expand those at the top, while the springs at the hub level will be unaffected and the intermediate springs will be more or less affected according to their positions. The spokes at the sides of the wheel will be in the lower parts of the spoke slots 26. As the wheel turns the springs are successively compressed and expanded, and the spokes will shift in the slots 26 both endwise and laterally. The wheel proper is entirely spring-supported. All shocks encountered by the tire 14, 15 will be received and largely absorbed by the springs.

The construction is simple and durable. There are no rubber parts to deteriorate, and the metal tread 24 will wear much longer than rubber.

Many changes in details of construction may be made without departing from the spirit of the invention.

I claim:

1. A resilient wheel comprising a rigid hollow metal tire of substantially circular cross-section, said tire being provided with a series of elongated slots along the central portion of the inner periphery thereof, a ring within the annular space on the inside of the tire, a series of spokes extending radially through said slots and rigidly secured to the ring, a series of spiral springs each having one of their ends seated upon the outside of the inner periphery of the tire between said slots, and devices connecting in a pivotal manner the other ends of the springs with the ring.

2. A resilient wheel comprising a hub, a rigid tubular metallic tire having a large annular space therein and a series of slots along the inner periphery of the tire, spokes passing freely through said slots and secured to the hub, a ring within said annular space and rigidly secured to the spokes, a series of bolts each pivotally secured to the ring and extending radially inwardly through openings in the tire alternate with the spoke slots, and a spiral spring concentric with each bolt and having one end secured to the inner end thereof and the opposite end bearing upon and secured to the tire.

3. A resilient tire comprising a rigid hollow tire having a large annular space therein, a series of spring-base seats formed integrally on the inner periphery of the tire, each of said seats having an internal groove to receive the spring base and also having a concentric opening through the tire wall into said space, spiral springs having their bases fastened in said seats, the axes of said springs being radial, radial bolts having their inner ends secured to the inner ends of the springs and passing into the tire's interior, a ring within the tire and pivotally secured to each of the bolts, and spokes passing through the tire and rigidly secured to said ring, the tire being provided with suitable openings to pass the spokes and permit the necessary movements thereof.

In testimony whereof I affix my signature in presence of two witnesses.

LAWRENCE W. GOODLAD.

Witnesses:
A. M. ROYAL,
K. IMBODEN.

Copies of this patent may be obtained for five cents each, by addressing the "Commissioner of Patents, Washington, D. C."